Nov. 13, 1962  R. C. ORTGIES ETAL  3,063,221
DUST COLLECTOR APPARATUS

Filed Dec. 31, 1958  2 Sheets-Sheet 1

INVENTORS
RAYMOND C. ORTGIES
&
ROBERT A. PALMORE

BY *Ralph B. Brick*
ATTORNEY

Nov. 13, 1962 R. C. ORTGIES ETAL 3,063,221
DUST COLLECTOR APPARATUS
Filed Dec. 31, 1958 2 Sheets-Sheet 2

INVENTORS
RAYMOND C. ORTGIES
&
ROBERT A. PALMORE
BY
Ralph B. Brick
ATTORNEY

United States Patent Office 3,063,221
Patented Nov. 13, 1962

3,063,221
DUST COLLECTOR APPARATUS
Raymond C. Ortgies and Robert A. Palmore, Louisville, Ky., assignors to American Air Filter Company, Inc., Louisville, Ky., a corporation of Delaware
Filed Dec. 31, 1958, Ser. No. 784,199
7 Claims. (Cl. 55—229)

This invention relates to dust collecting apparatus and more particularly to an improved dust collecting apparatus of the wet type wherein a dirty gas stream is centrifuged against a water wetted surface to effect the removal of its dust content.

It has long been known in the art to clean a dirty stream of gas by centrifuging it against a water wetted surface to remove its dust content. For the most part, the equipment required for such operations has been both heavy and space consuming, requiring large volumes of liquid for wetting. Furthermore, whenever liquid drainage at the end of a day's operations has been required to avoid such problems as liquid freeze over or overnight valve clogging by dust settlement, such liquid drainage has proven to be time consuming, presenting an equally time consuming refilling problem before commencing the next day's operation.

The present invention provides a dust collecting apparatus which avoids the abovementioned problems, the apparatus of the present invention having a high gas stream handling capacity and a high gas cleaning efficiency. In addition, the present invention provides a dust collecting apparatus which requires a minimum of liquid for cleaning operations. Further, the present invention provides a dust collecting apparatus which is straightforward and inexpensive in its construction, operation and maintenance. Various other features of the present invention will become obvious to one skilled in the art upon reading the disclosure set forth herein.

More particularly, the present invention provides a dust collector of the type wherein a dirty gas stream is centrifuged against a liquid bath to effect removal of its dust content comprising a housing including a shallow liquid sump means positioned in the lower portion thereof, partition means disposed within the housing to provide a gas inlet and gas outlet chamber above the sump means, the partition means including impeller means extending from the lower portion thereof into the sump means, the impeller means defining a gas centrifuging path communicably connecting the gas inlet and the gas outlet chambers, blower means operative to move a dirty gas stream from the gas inlet chamber through the gas centrifuging path defined by the impeller means into the gas outlet chamber at sufficient velocity to sweep a stream of liquid from the sump therewith, drain trough means positioned in the gas outlet chamber in cooperable relationship with the impeller means to receive a portion of the stream of liquid swept through the gas centrifuging path defined by the impeller means, liquid supply means cooperating with the shallow liquid sump means to replace that portion of liquid swept from the sump means and passed into the drain trough means, and baffle means cooperating with the shallow liquid sump means to recirculate liquid from that portion of the liquid sump means below the gas outlet chamber to that portion of the liquid sump means below the gas inlet chamber, the baffle means having a contour arranged to create with the liquid sump means a turbulent liquid area adjacent the impeller means.

It is to be understood that various changes can be made by one skilled in the art in the arrangement, form, and construction of the several parts of the apparatus disclosed herein without departing from the scope or spirit of the present invention.

Referring to the drawings which disclose one advantageous embodiment of the present invention:

Figure 1:
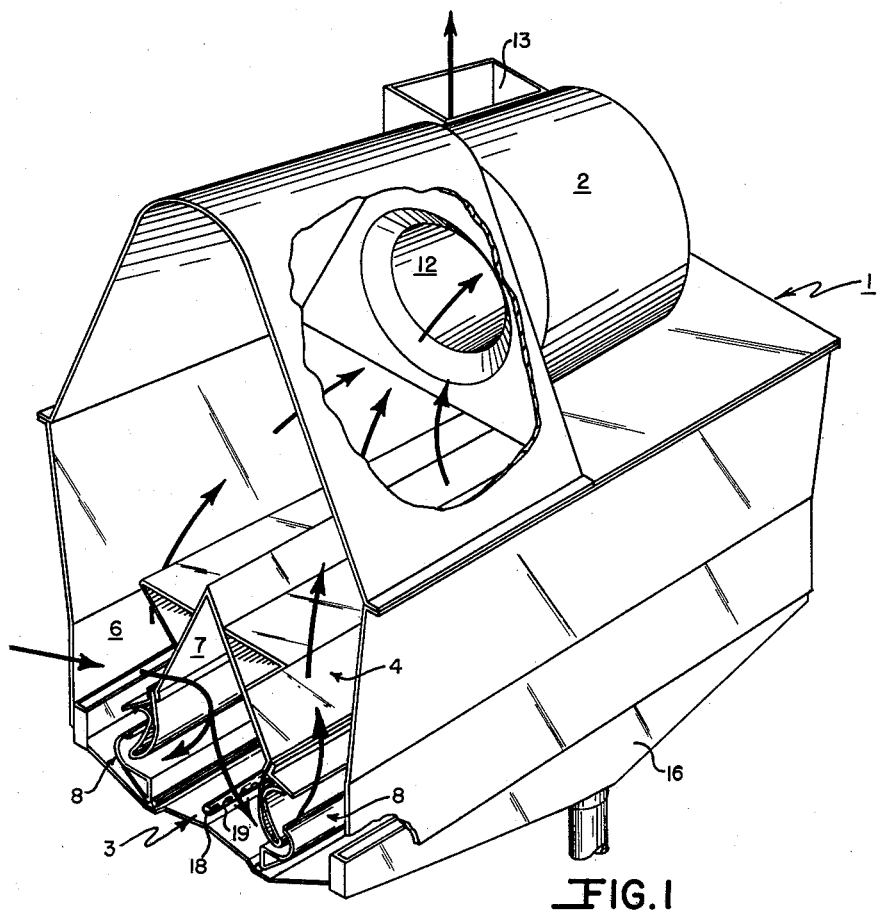
FIGURE 1 is a broken perspective of a dust collector incorporating features of the present invention.
Figure 2:
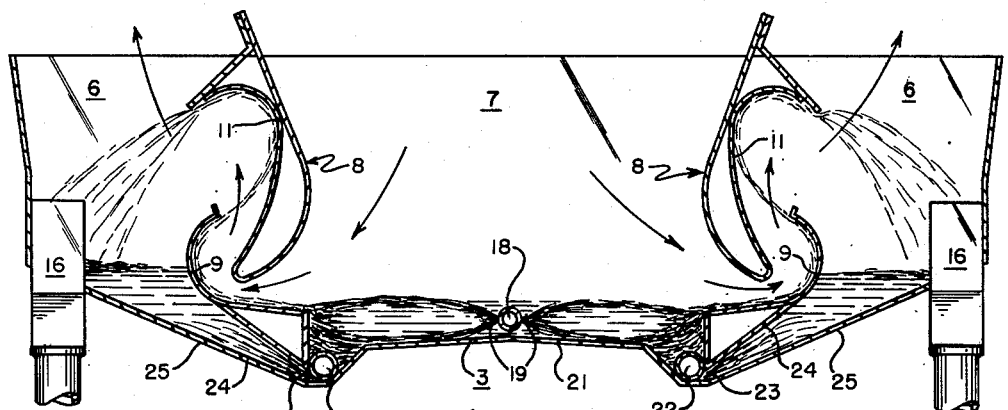
FIGURE 2 is a fragmentary enlarged elevational view of the impeller and baffle arrangement of FIGURE 1.

Referring to FIGURES 1 and 2 of the drawings, the present invention is shown incorporated in a dust collector including housing 1 having positioned on the top portion thereof a blower arrangement 2. Housing 1 has disposed at its lower portion a shallow liquid sump designated broadly by reference numeral 3. As will be discussed more fully hereinafter, the bottom portion of sump 3 is of specific contour to provide maximum gas-liquid wetting contact with minimum liquid requirement for efficient operation.

Positioned within housing 1 is a second housing member 4, the outer face of housing member 4 defining with the inner face of housing 1 a gas outlet chamber 6 above liquid sump 3 and the inner face of housing member 4 defining a gas inlet chamber 7 above liquid sump 3. In this connection, it is to be noted that a gas inlet (not shown) is provided in at least one of the side walls of housing 1 to permit gas passage into the gas inlet chamber 7. It further is to be noted that opposite walls of housing member 4 each include an impeller extending vertically from the lower portion thereof into sump 3, each impeller being designated broadly by the reference numeral 8.

As can be seen in FIGURE 2 of the drawings, the impellers 8 each define an S-shaped slot like sinuous path communicably connecting the gas inlet chamber 7 with the gas outlet chamber 6, the shape of the path defined by one impeller being a mirror image of the shape of the path defined by the other. In a manner similar to that set forth in assignee's Patent No. 2,373,330, issued to Arthur Nutting on April 10, 1945, each impeller 8 includes an upwardly extending concave gas-directing surface 9 serving to define the convex side of the lower half of the S path. The upper edge of surface 9 is disposed to discharge liquid more or less obliquely across the central portion of the S path while its lower end is tangentially extended downwardly into the sump 3 at an angle approximately 15° to the horizontal for a distance which brings the extension below the level of liquid in the sump when the sump is ready for operation. Each impeller 8 further includes an upwardly extending convex gas-directing surface 11 to define the concave side of the lower half of the S path and the convex side of the upper half of the S path. The upper edge of surface 11 is so disposed that during gas cleaning operations it will discharge liquid across the path of the gas column leaving the S path. In this connection, it is to be noted that blower arrangement 2 provided on top of housing 1 moves the dirty gas streams from the gas inlet chamber 7 through the gas centrifuging paths defined by the impeller 8 into gas outlet chamber 6. From chamber 6, the gases which have been cleaned by centrifuging and by liquid contact in a manner described more fully hereinafter are moved through an inlet 12 of blower arrangement 2 and through exhaust outlet 13 of such blower arrangement.

In accordance with one of the inventive features of the present dust collector, a pair of collecting, truncated drain troughs 16 is provided in the gas outlet chamber 6. Each of troughs 16 is positioned in chamber 6 in a preselected spaced relationship from its corresponding impeller 8 to receive a portion of the liquid discharged from the upper surface 11 which defines a portion of the S-path. Advantageously, the spacing of troughs 16 from impellers 8 is such that approximately one-sixth of the liquid passed through impellers 8 is captured by troughs 16, the liquid being passed from the troughs through a straight through pipe to a suitable settling basin not shown. This liquid, which contains the dust particles captured from the gas stream that has impinged thereagainst and passed therethrough, is simultaneously replaced by a liquid supply system that cooperates with the shallow liquid sump 3 in such a manner as to insure thorough gas liquid contact. This continuous circulation of liquid, along with the continuous replacement of a dirty portion of the liquid with a clean portion, serves to avoid past problems of collector clogging and to insure a more thorough cleaning of the dirty gas.

Referring to FIGURES 1 and 2, it can be seen that the liquid supply system includes a header conduit 18 connected to a suitable liquid reservoir (not shown) and extending transverse the liquid sump 3 below the gas inlet chamber 7. Conduit 18 is provided with a plurality of orifices 19 spaced along the longitudinal axis on either side of the conduit, the orifices being arranged to direct jets of water along the liquid surface of the liquid bath in sump 3 during dust collecting operation so as to provide surface turbulence and thus insure more thorough gas-wetting operations. The orifices 19 of conduit 18 are also arranged to direct jets of water along the bottom 21 of sump 3 to sweep the same and prevent dirt build-up therealong. To accomplish this effectively and to avoid buildup of dust around conduit 18, it has been found advantageous to position this conduit so that it will be below the surface of the liquid during normal operations. Further, it has been found advantageous to arrange the orifices in conduit 18 so that they are somewhat larger downstream of the supply reservoir where the discharge pressure is less. With such an arrangement, possible clogging by dirt particles captured by the liquid from dirty gases during dust collecting operations is avoided. In addition, it also has been found advantageous, under certain conditions, to recirculate the fresh liquid in interrupted cycles so that the initial impact of liquid through the system provides further liquid surface turbulence and serves to further avoid problems of dirt clogging.

As can be clearly noted in FIGURE 2 of the drawings, the bottom portion 21 of shallow liquid sump 3 is of turtle-back contour, sloping downwardly from its median toward the base of each of impellers 8. This arrangement allows a sufficient depth of liquid at the entering edge of each of impellers 8 to provide an effective seal between the dirty gas inlet chamber 7 and the clean gas outlet chamber 6 and thus eliminate dirty gas by-passing. At the same time, this arrangement prevents build-up of dirt along the bottom of the sump below the gas inlet chamber 7. As will be noted, a suitable drain valve 22 is provided below each impeller 8, each drain valve advantageously being of a gate type to further avoid valve clogging.

Since only a minor portion of the liquid thrown from impellers 8 is captured by troughs 16, the major portion returns to liquid sump 3, this liquid being recirculated through passages 23 below impellers 8 with the fresh liquid emanating from conduit 18. In this connection, it is to be noted that a baffle 24 is provided below each impeller 8, each baffle 24 being arranged to provide a downwardly narrowing passage with the bottom portion 25 of sump 3 below each impeller 8. Thus, as that portion of liquid thrown from impellers 8 is recirculated with the fresh liquid from conduit 18, its velocity is increased. This increased velocity provides an added liquid turbulence adjacent impellers 8 and further prevents dust settling at such areas.

Figure 3:
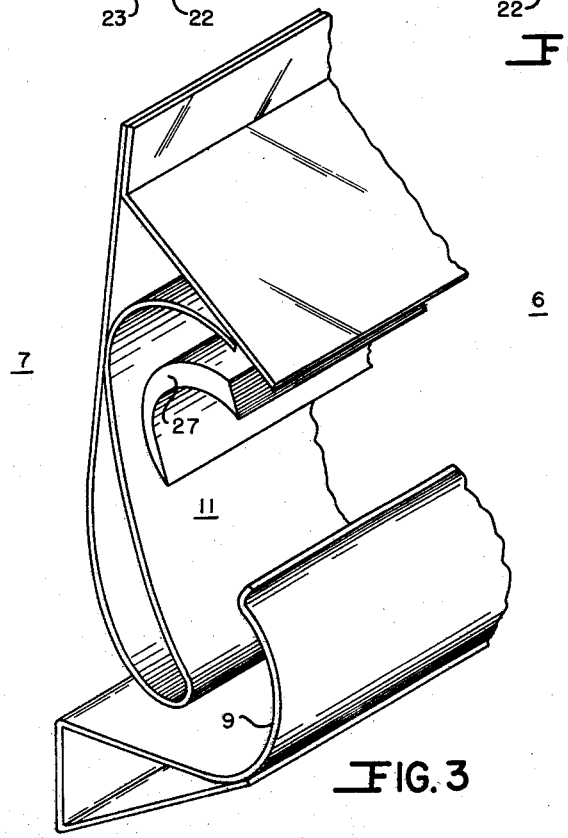
FIGURE 3 is an enlarged fragmentary perspective view of the impeller arrangement of FIGURES 1 and 2 and further including a crescent blade member combined therewith.

Referring to FIGURE 3 of the drawings, it can be seen that a crescent-shaped blade member 27 can be positioned in the upper portion of the S-shaped, sinuous gas centrifuging path defined by an impeller member. This blade, when employed, serves to divide the stream of liquid swept by incoming gases from the sump into two separable streams through which at least a portion of the gas stream passing through the impeller must pass to thus insure further intimate contact of the gas with the liquid. It is to be understood that such a blade member can also be positioned in the lower portion of an S-shaped path to create a double throw of liquid at that area in the path, if so desired. Moreover, it is to be understood that a crescent blade member 27 can be arranged advantageously in the upper portion of a S-shaped path to direct separate liquid streams from an impeller in such a manner that one stream is captured in the drain trough and the other returned to the liquid sump.

The apparatus of the present invention can include any one of a number of well known liquid level control devices to maintain a proper liquid level in the shallow liquid sump during gas cleaning operations and, if so desired, a liquid level control arrangement similar to that disclosed in assignee's Patent No. 2,403,545, issued to Arthur Nutting on July 9, 1946, can be used with the apparatus of the present invention.

In a typical operation of the inventive apparatus, dirty gas, for example 1000 c.f.m. for each horizontal foot of slot opening, is induced by blower 2 into gas inlet chamber 7 at sufficient velocity to impinge against the turbulent surface of the liquid bath in sump 3, the gas then moving as ribbons along the S-shaped paths formed by the impellers 8 and carrying streams of liquid from the sump upwardly therewith. As described fully in assignee's aforementioned Patent No. 2,373,330, the streams of liquid not only assume the form of liquid films flowing along the concave walls of impellers 8 to the discharge ends thereof, but in addition they assume the form of liquid curtains projecting across the gas streams either from the end of the first films or from the ends of each film as desired. Finally, and in accordance with the present invention, as the liquid passes from the impellers 8, a portion—advantageously one-sixth—is received by drain troughs 16 and the remainder is recirculated into sump 3 along with fresh liquid from header conduit 18, the narrow passages 23 increasing the velocity of the liquid as it is recirculated, creating further turbulence around impellers 8 and preventing dust settling.

Thus, in accordance with the apparatus of the present invention, it is possible to efficiently and thoroughly clean a dirty gas stream such as air with a minimum amount of cleaning liquid such as water without incurring past problems of clogging and frequent shut-down of such apparatus for cleaning purposes. Moreover, if and when shut-down is required, it can be accomplished swiftly and efficiently, permitting ready accessibility to the various parts of such apparatus for cleaning operations and allowing for quick and efficient startup.

The invention claimed is:

1. A dust collector of the type wherein a dirty gas stream is centrifuged against a liquid bath to effect removal of its dust content comprising: a housing having a gas inlet and gas outlet means and including a shallow liquid sump means positioned in the lower portion thereof, partition means disposed within said housing to provide a gas inlet and a gas outlet chamber above said sump means, said partition means including impeller means extending from the lower portion thereof into said sump means, said impeller means defining a gas centrifuging path communicably connecting said gas inlet and said gas outlet chambers, blower means operative to move a dirty gas stream from said gas inlet chamber through said gas centrifuging path defined by said impeller means into said gas outlet chamber at a sufficient velocity to sweep a stream of liquid from said liquid sump means therewith, drain trough means positioned in said gas outlet chamber in cooperable relationship with said impeller means and separate from said sump means to receive and pass off to waste only a portion of said stream of liquid swept through said gas centrifuging path defined by said impeller means with the remainder of said liquid being passed to said sump, said drain trough means being so positioned relative said impeller means that the portion of the liquid received thereby is from the outer extremities of said gas centrifuging path where contaminant concentrations are the greatest, and liquid supply means cooperating with said shallow liquid sump means to replace that portion of liquid swept into said drain trough means with substantially uncontaminated liquid.

2. A dust collector of the type wherein a dirty gas stream is centrifuged against a liquid bath to effect removal of its dust content comprising: a housing having a gas inlet and a gas outlet and including a shallow liquid sump positioned in the lower portion thereof, a vertically extending partition in said housing to provide a gas inlet and a gas outlet chamber above said shallow sump, said partition including an impeller extending from the lower portion thereof into said sump, said impeller defining a gas centrifuging path communicably connecting said gas inlet and said gas outlet chambers, a blower operative to move a dirty gas stream from said gas inlet chamber through said gas centrifuging path defined by said impeller into said gas outlet chamber at sufficient velocity to sweep a stream of liquid from said sump therewith a drain trough positioned in said gas outlet chamber in spaced cooperable relationship with said impeller and separate from said sump to receive and pass off to waste only a portion of said stream of liquid swept through said gas centrifuging path defined by said impeller with the remainder of said liquid being passed to said sump, said drain trough being so positioned relative said impeller that the portion of the liquid received thereby is from the outer extremtiies of said gas centrifuging path where contaminant concentrations are the greatest, and a liquid supply system cooperating with said liquid sump to replace that portion of liquid swept into said drain trough with substantially uncontaminated liquid, said liquid supply system including a header conduit extending transverse said liquid sump adjacent the operating liquid surface of said sump, said header having a plurality of orifices disposed therein arranged so that liquid therefrom creates a surface turbulence in said liquid sump for better wetting action and sweep the bottom of said liquid sump.

3. A dust collector of the type wherein a dirty gas stream is centrifuged against a liquid bath to effect removal of its dust content comprising: a housing having a gas inlet means and a gas outlet means and including a shallow liquid sump means positioned in the lower portion thereof, partition means disposed within said housing to provide a gas inlet and a gas outlet chamber above said sump means, said partition means including impeller means extending from the lower portion thereof into said liquid sump means, said impeller means defining a gas centrifuging path communicably connecting said gas inlet and said gas outlet chambers, blower means operative to move a dirty gas stream from said gas inlet chamber through said gas centrifuging path defined by said impeller means into said gas outlet chamber at a sufficient velocity to sweep a stream of liquid from said liquid sump means therewith, drain trough means positioned in said gas outlet chamber in cooperable relationship with said impeller means and separate from said sump means to receive and pass off to waste only a portion of said stream of liquid swept through said gas centrifuging path defined by said impeller means with the remainder of said liquid being passed to said sump, said drain trough means being so positioned relative said impeller means that the portion of the liquid received thereby is from the outer extremities of said gas centrifuging path where contaminant concentrations are the greatest, liquid supply means cooperating with said shallow liquid sump means to replace that portion of liquid passed into said drain trough means with substantially uncontaminated liquid, and baffle means cooperating with said shallow liquid sump means to recirculate liquid from that portion of said liquid sump means below said gas outlet chamber to that portion of said liquid sump means below said gas inlet chamber, said baffle means cooperating with the bottom of said sump to form a passage of tapering contour of sufficient narrowness to create a turbulent liquid area adjacent said impeller means to insure more thorough gas wetting.

4. A dust collector of the type wherein a dirty gas stream is centrifuged against a liquid bath to effect removal of its dust content comprising: a housing having a gas inlet and a gas outlet and including a shallow liquid sump positioned in the lower portion thereof, a vertically extending partition in said housing to provide a gas inlet and a gas outlet chamber above said shallow sump, said partition including an impeller extending from the lower portion thereof into said sump, said impeller defining an S-shaped sinuous gas centrifuging path communicably connecting said gas inlet and said gas outlet chamber, a blower operative to move a dirty gas stream from said gas inlet chamber through said gas centrifuging path defined by said impeller into said gas outlet chamber at sufficient velocity to sweep a stream of liquid from said sump therewith, blade member means positioned in said S-shaped sinuous gas centrifuging path to divide the stream of liquid swept from said sump into a plurality of separate liquid stream throws through each of which at least a portion of said gas stream must pass, a drain trough positioned in said gas outlet chamber in spaced cooperable relationship with said impeller and separate from said sump to receive and pass off to waste only a portion of said stream of liquid swept through said gas centrifuging path defined by said impeller with the remainder of said liquid being passed to said sump, said drain trough being positioned relative said impeller that the portion of the liquid received thereby is from the outer extremities of said gas centrifuging path where contaminant concentrations are the greatest, and a liquid supply means cooperating with said liquid sump to replace that portion of liquid swept into said drain trough with substantially uncontaminated liquid.

5. A dust collector of the type wherein a dirty gas stream is centrifuged against a liquid bath to effect removal of its dust content comprising: a housing having a gas inlet and a gas outlet and including a shallow liquid sump positioned in the lower portion thereof, a vertically extending partition in said housing to provide a gas inlet and a gas outlet chamber above said shallow sump, said partition including an impeller extending from the lower portion thereof into said sump, said impeller defining an S-shaped sinuous gas centrifuging path communicably connecting said gas inlet and said gas outlet chambers, a blower operative to move a dirty gas stream from said gas inlet chamber through said gas centrifuging path defined by said impeller into said gas outlet chamber at sufficient velocity to sweep a stream of liquid from said sump therewith, a blade member means positioned in the upper portion of said S-shaped sinuous gas centrifuging path to divide the stream of liquid swept from said sump into at least two separate liquid stream throws through each of which at least a portion of said gas stream must pass, a drain trough positioned in said gas outlet chamber in spaced cooperable relationship with said impeller and separate from said sump to receive and pass off to waste only that separated liquid stream throw adjacent the outer portion of the gas centrifuging path and having the greatest contaminant concentration with the remainder of said liquid being passed to said sump, and a liquid supply means cooperating with said sump to supply such sump with substantially uncontaminated liquid.

6. A dust collector of the type wherein a dirty gas stream is centrifuged against a liquid bath to effect removal of its dust content comprising: a housing having a gas inlet means and a gas outlet means and including a shallow liquid sump means positioned in the lower portion thereof, partition means disposed within said housing to provide a gas inlet and a gas outlet chamber above said sump means, said partition means including impeller means extending from the lower portion thereof into said sump means, said impeller means defining a gas centrifuging path communicably connecting said gas inlet and said gas outlet chambers, blower means operative to move a dirty gas stream from said gas inlet chamber through said gas centrifuging path defined by said impeller means into said gas outlet chamber at a sufficient velocity to sweep a stream of liquid from said liquid sump means therewith, drain trough means positioned in said gas outlet chamber in cooperable relationship with said impeller means and separate from said sump means to receive and pass off to waste only approximately one-sixth of said stream of liquid swept through said gas centrifuging path defined by said impeller means with the remainder of said liquid being passed to said sump, said drain trough means being so positioned relative said impeller means that the portion of the liquid received thereby is from the outer extremities of said gas centrifuging path where contaminant concentrations are the greatest, and liquid supply means cooperating with said shallow liquid sump means to replace that portion of liquid swept into said drain trough means with substantially uncontaminated liquid.

7. A dust collector of the type wherein a dirty gas stream is centrifuged against a liquid bath to effect removal of its dust content comprising: an outer first housing member having a gas inlet and a gas outlet and including a shallow liquid sump positioned in the lower portion thereof, an inner second housing member disposed within said first housing member, the outer face of said second housing member defining with said first housing member a gas outlet chamber above said shallow liquid sump and the inner face of said second housing member defining a gas inlet chamber above said shallow liquid sump, the opposite walls of said second housing member each including an impeller extending vertically from the lower portion thereof into said sump, each impeller defining an S-shaped sinuous gas centrifuging path communicably connecting said gas inlet and said gas outlet chambers with the shape of the path of one impeller being a mirror image of the shape of the path of the other impeller, a blower operative to move dirty gas streams from said gas inlet chamber through said gas centrifuging paths defined by said impellers into said gas outlet chamber at sufficient velocities to sweep streams of liquid from said shallow liquid sump therewith, a blade member positioned in the upper portion of each of said S-shaped sinuous gas centrifuging paths to divide each of the streams of liquid swept from said sump into two separate liquid throws through each of which at least a portion of said gas stream must pass, the upper of the two throws including approximately one-sixth of the liquid of its stream, a drain trough for each impeller positioned in said gas outlet chamber in spaced cooperable relationship with its impeller to receive and pass off to waste only the liquid of the upper throw with the remainder of said liquid being passed to said sump, a liquid supply means cooperating with said liquid sump to replace that portion of liquid swept into said drain troughs with substantially uncontaminated liquid, said liquid supply means including a header conduit extending transverse said liquid sump and positioned so as to be below the liquid surface of said liquid sump during dust collecting operations, said header having a plurality of orifices disposed therein arranged so that liquid therefrom creates a surface turbulence in said liquid sump for better wetting action and sweeps the bottom of said sump, and baffle means cooperating with said shallow liquid sump to recirculate liquid from that portion of said liquid sump below said gas outlet chamber to that portion of said liquid sump below said gas inlet chamber, said baffle means being of a contour to create a turbulent liquid area adjacent each of said impellers.

References Cited in the file of this patent

UNITED STATES PATENTS

| | | |
|---|---|---|
| 2,259,626 | Erikson | Oct. 21, 1941 |
| 2,373,330 | Nutting | Apr. 10, 1945 |
| 2,403,545 | Nutting | July 9, 1946 |
| 2,491,645 | Clark et al. | Dec. 20, 1949 |
| 2,585,659 | Kilpatrick | Feb. 12, 1952 |
| 2,753,949 | Manuel | July 10, 1956 |
| 2,767,806 | Blake | Oct. 23, 1956 |
| 2,792,905 | Forrest | May 21, 1957 |
| 2,805,845 | Berry | Sept. 10, 1957 |
| 2,890,870 | Spiselman | June 16, 1959 |
| 2,920,946 | Weaver et al. | Jan. 12, 1960 |

FOREIGN PATENTS

| | | |
|---|---|---|
| 569,866 | Great Britain | June 12, 1945 |
| 595,404 | Germany | Apr. 10, 1934 |